May 14, 1929.         G. W. GRAYSON         1,713,178
CONTROL OF THE SUPPLY OF FUEL TO DIESEL CYCLE OR
MIXED CYCLE INTERNAL COMBUSTION ENGINES
Filed Oct. 20, 1926
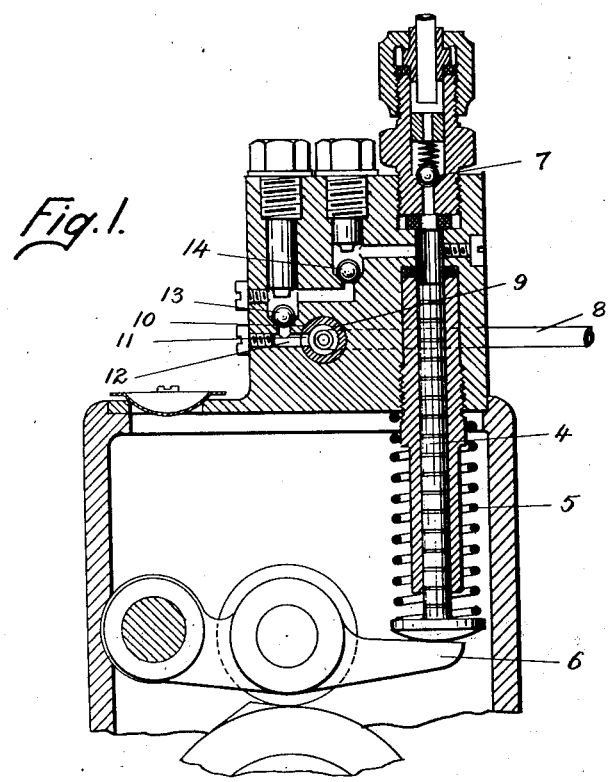
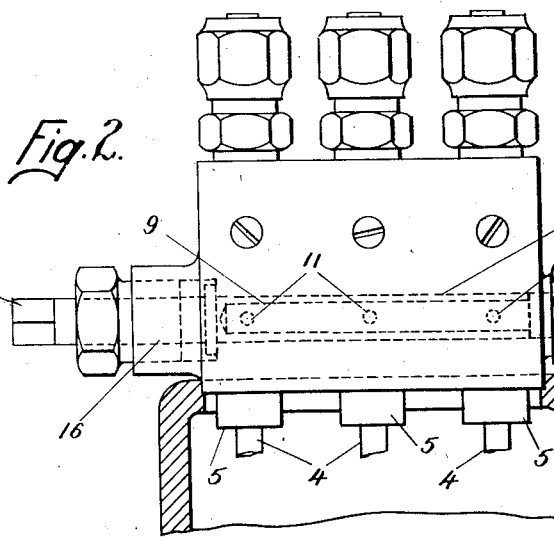
G. W. Grayson
  inventor
By: Marks & Clark
        Attys.

Patented May 14, 1929.

1,713,178

UNITED STATES PATENT OFFICE.

GEORGE WENTWORTH GRAYSON, OF SYDNEY, NEW SOUTH WALES, AUSTRALIA, ASSIGNOR TO GRAYSON ENGINE COMPANY LIMITED, OF SYDNEY, NEW SOUTH WALES, AUSTRALIA, A COMPANY OF NEW SOUTH WALES.

CONTROL OF THE SUPPLY OF FUEL TO DIESEL-CYCLE OR MIXED-CYCLE INTERNAL-COMBUSTION ENGINES.

Application filed October 20, 1926, Serial No. 142,963, and in Australia November 11, 1925.

This invention relates to the supply of fuel to the cylinders of internal combustion engines operating on the Diesel or mixed cycle principle.

In engines operating on this principle variations in speed and power are generally obtained by varying the amount of fuel injected to the cylinders per working stroke of the pistons and this has generally been done by altering the stroke of the fuel pump or injection device or by diverting portion of the fuel being fed to the cylinder so that the amount actually injected is sufficient for the speed and power required. These methods require either a complicated arrangement of the links or the like for varying the stroke of the injection device or of valves for bye-passing the required amount of fuel.

It is the object of this invention to provide a simple and efficient means for varying the power and speed of the engine.

This is accomplished by providing a constant stroke injection device and providing means whereby only the amount of fuel actually required at the instant is delivered to it for injection into the cylinder.

The present invention consists in an injection device apparatus for the control of the supply of fuel to the cylinders of internal combustion engines of the type operating on the Diesel or mixed cycle principle and in which the fuel supplied to a constant stroke injection pump is controlled by a governor or other means, the provision of a hollow rotatable spindle valve arranged in the fuel passage of the pump, said valve having a lateral opening that is adapted to register with the said fuel passage.

A mechanism constructed according to this invention is illustrated in the accompanying drawings in which:—

Figure 1 is a sectional elevation, and

Figure 2 is a side elevation of the necessary mechanism for a three cylinder engine.

The injection device for each cylinder consists of a constant stroke plunger 4 which is operated in the barrel 5 by the cam actuated lever 6, and which forces fuel past the valve 7 into the fuel line to the atomizing valve in the cylinders. Fuel is supplied through the pipe 8 and passes into the interior of the sleeve 9 which is rotatable within the passage 10. Each of the holes 11 in the sleeve 9 is adapted to register with a passage 12 so that by rotating the sleeve the communicating openings between the passage 10 and the passages to the injection devices may be varied from nothing to full bore.

Thus by altering the position of the sleeve 9 the fuel openings may be varied and consequently the rate of supply of the fuel which passes through the series of check valves 13 and 14 to the barrel of the injection device. Hence the power and speed of the engine may be varied.

The sleeve 9 may be adjusted by any suitable means by means of the shaft 15 which passes through the gland 16.

I claim:—

1. A means for controlling the supply of fuel to the cylinders of an internal combustion engine operating on the Diesel or mixed cycle principle comprising a constant stroke fuel injection device, and a hollow spindle valve rotatably mounted in the fuel duct leading to said injection device and having an opening therein variable in size dependable on the position of the spindle.

2. A means for controlling the supply of fuel to the cylinder of an internal combustion engine operating on the Diesel or mixed cycle principle comprising a cam operated constant stroke injection device, a fuel passage, a hollow rotatable spindle within said passage, said spindle having an opening adapted to register with a passage to said injection device and means for rotating said spindle.

3. An injection apparatus for the control of the supply of fuel to the cylinders of internal combustion engines of the type for operating on the Diesel or mixed cycle principle and in which the fuel supplied to the constant stroke of the injection pump is controlled by a governor, the provision of a hollow rotatable spindle valve arranged in the fuel passage to the pump, said valve having a lateral opening that is adapted to register with the said fuel passage.

In testimony whereof I have affixed my signature.

GEORGE WENTWORTH GRAYSON.